(12) United States Patent
Koiwai et al.

(10) Patent No.: US 6,671,108 B2
(45) Date of Patent: Dec. 30, 2003

(54) OPTICAL APPARATUS INCLUDING LENS

(75) Inventors: Tamotsu Koiwai, Akiruno (JP); Ai Midorikawa, Iruma-gun (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 10/145,237

(22) Filed: May 13, 2002

(65) Prior Publication Data

US 2002/0167741 A1 Nov. 14, 2002

(30) Foreign Application Priority Data

May 14, 2001 (JP) .......................... 2001-143425

(51) Int. Cl.$^7$ .......................... G02B 7/02; G03B 17/26; G03B 21/14; F21V 17/00
(52) U.S. Cl. .................... 359/819; 396/526; 362/455; 353/100
(58) Field of Search ................................ 359/820, 819, 359/811, 821, 822, 703, 702, 700, 701, 704; 396/526; 362/455; 353/100

(56) References Cited

U.S. PATENT DOCUMENTS

| | | | | |
|---|---|---|---|---|
| 3,989,358 A | * | 11/1976 | Melmoth | 359/813 |
| 5,029,791 A | * | 7/1991 | Ceccon et al. | 248/287.1 |
| 5,396,487 A | * | 3/1995 | Abe et al. | 359/819 |

FOREIGN PATENT DOCUMENTS

JP        11-271587       8/1999

\* cited by examiner

Primary Examiner—Hung Xuan Dang
Assistant Examiner—Joseph Martinez
(74) Attorney, Agent, or Firm—Ostrolenk, Faber, Gerb & Soffen, LLP

(57) ABSTRACT

There is disclosed an optical apparatus in which a lens holding frame is assembled on a frame member so that the lens holding frame can move along a plane substantially vertical to the optical axis of first and second lenses, a pair of gaps is formed between the outer periphery of the lens holding frame and the inner periphery of the frame member via the optical axis in the X- and Y-axis directions, adjustment members are selectively inserted in the gaps, and the position of the lens holding frame to the frame member in the plane substantially vertical to the optical axis is set.

20 Claims, 5 Drawing Sheets

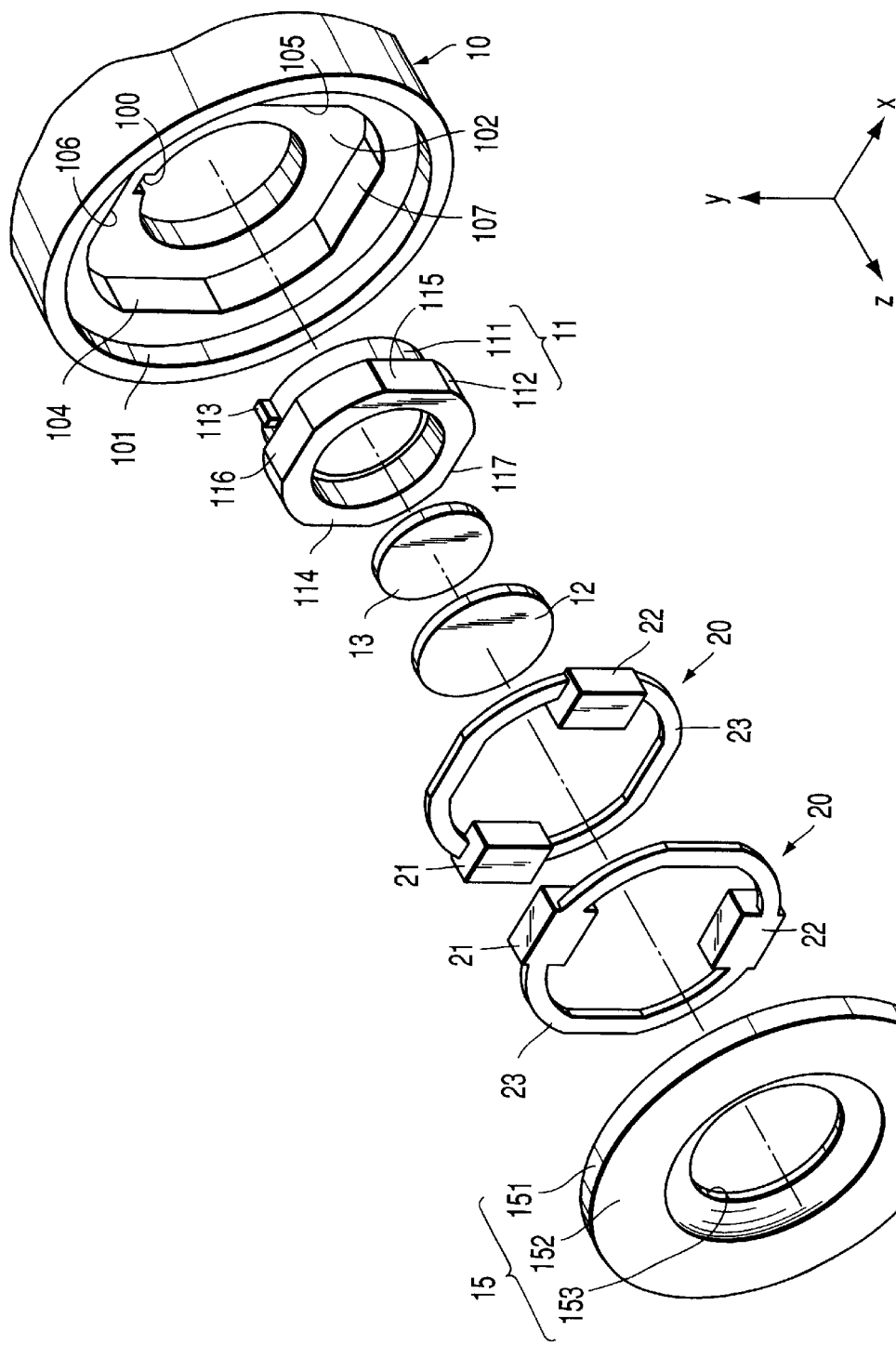
F I G. 6

OPTICAL APPARATUS INCLUDING LENS

CROSS-REFERENCE TO RELATED APPLICATIONS

This application is based upon and claims the benefit of priority from the-prior Japanese Patent Application No. 2001-143425, filed May 14, 2001, the entire contents of which are incorporated herein by reference.

BACKGROUND OF THE INVENTION

1. Field of the Invention

The present invention relates to optical apparatuses including lenses, such as a camera and observation apparatus.

2. Description of the Related Art

In general, in an optical apparatus, a plurality of lens groups constituting an optical system are contained/disposed in a lens holding frame, the lens holding frame is positioned and assembled in a frame member, and the frame member is mounted in a lens barrel of the optical apparatus such as a camera. In order to sufficiently fulfill capabilities of the optical system, the plurality of lens groups are required to be accurately positioned relative to each other. To make this possible, various lens adjustment techniques for accurately adjusting the positions of the plurality of lens groups have been proposed.

Examples of the techniques include a method of disposing a predetermined gap between the lens holding frame which holds a lens and the frame member into which the lens holding frame is assembled, using this gap to adjust the position of the lens holding frame in a plane at right angles to an optical axis, and positioning and bonding or otherwise fixing the lens holding frame onto the frame member after the adjustment.

Moreover, in Jpn. Pat. Appln. KOKAI Publication No. 11-271587, a technique of disposing two eccentric pins, rotating/operating these eccentric pins, and adjusting positions in two directions substantially at right angles to each other is proposed.

However, in the former method, the positions can be adjusted with a simple constitution, but there are many degrees of freedom in the adjustment direction of the lens holding frame, and operation properties are not satisfactory. For example, some kind of adjustment device is required to perform an accurate adjustment. Furthermore, according to this method, after the lens holding frame is adjusted, the frame is fixed to the frame member by measures such as an adhesive. Therefore, there is a problem that the optical axis suffers a positional deviation during the bonding operation.

Moreover, in the latter technique described in the Jpn. Pat. Appln. KOKAI Publication No. 11-271587, when one of two eccentric pins is operated, the lens holding frame rotates centering on the other eccentric pin, and it is difficult to perform a high-precision adjustment.

As described above, in an optical apparatus including a lens, there is the disadvantage that it is very troublesome to adjust the position of the lens mounted on the lens holding frame.

BRIEF SUMMARY OF THE INVENTION

An object of the present invention is to provide an optical apparatus in which high-precision lens position adjustment can conveniently and easily be realized with a simple constitution.

According to the present invention, there is provided an optical apparatus comprising a lens holding frame which holds a lens; and a frame member to support the lens holding frame so that the lens holding frame can move along a plane substantially vertical to the optical axis of the lens, wherein a gap is formed between the outer periphery of the lens holding frame and the inner periphery of the frame member, and an adjustment member is inserted in the gap, so that the position of the lens holding frame relative to the frame member in the plane is set.

According to the above construction, when the position of the lens holding frame is adjusted with respect to the frame member, the adjustment member is inserted in the gap between the frame and the member, and the frame and member are moved/adjusted in the plane substantially vertical to the optical axis of the lens by an amount corresponding to the size of the adjustment member. The relative positions are thereby determined by the adjustment member in an adjustment position. Therefore, a simple construction is obtained. Additionally, high-precision positional adjustment of the lens optical axis is realized with the simple operation of selecting the size of the adjustment member and inserting the member in the gap.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 6 is an exploded perspective view showing the main constitution of an optical apparatus according to another embodiment of the present invention.

DETAILED DESCRIPTION OF PREFERRED EMBODIMENTS OF THE INVENTION

Preferred embodiments of the present invention will be described hereinafter in detail with reference to the drawings.

Figure 1:
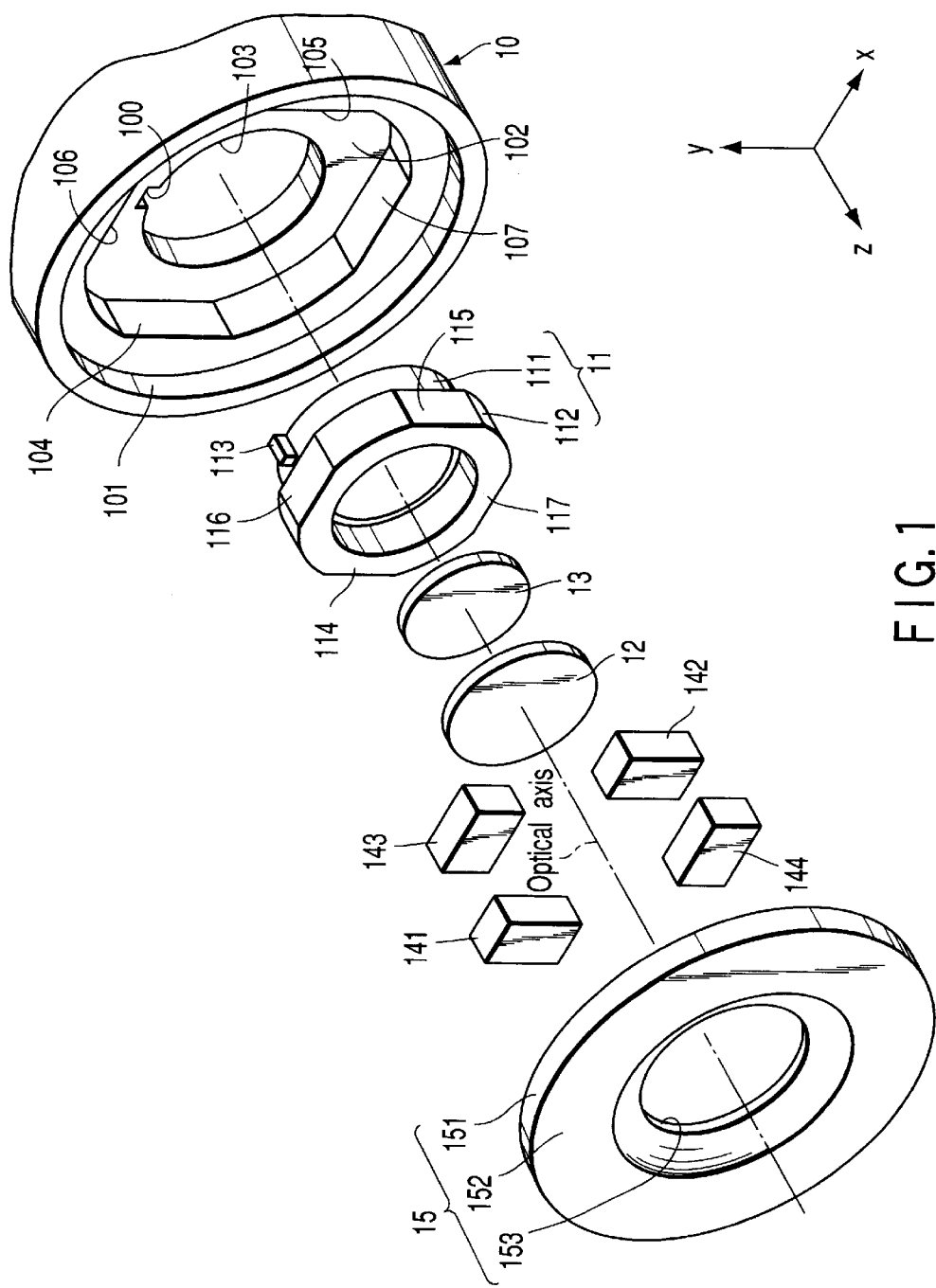
FIG. 1 is an exploded perspective view showing a main constitution of an optical apparatus according to one embodiment of the present invention.
Figure 2:
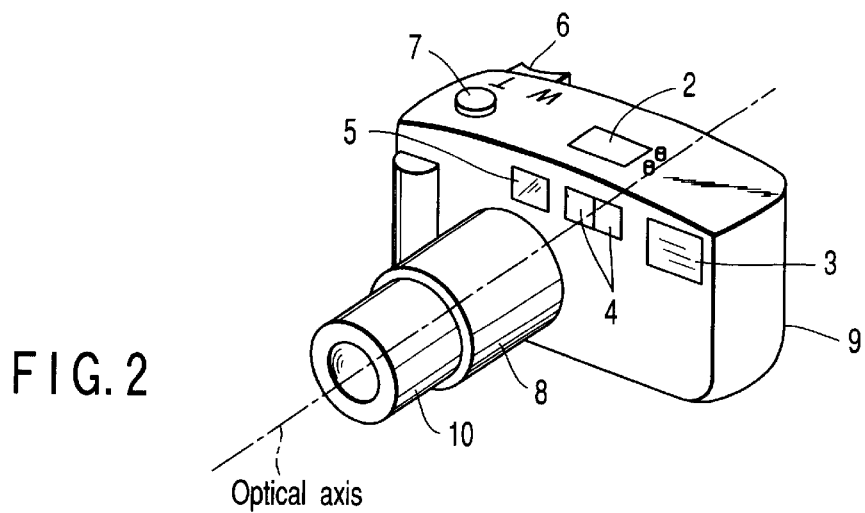
FIG. 2 is a perspective view showing a schematic constitution of a camera to which the constitution of FIG. 1 is applied.

FIG. 1 shows an optical apparatus according to one embodiment of the present invention. A frame member 10 is mounted/disposed in a lens barrel 8 of a camera main body 9, for example, as shown in FIG. 2. A lens holding frame 11 is mounted onto the frame member 10. In FIG. 1, the optical axis direction is shown as the Z-axis, a first direction crossing at right angles to the optical axis is shown as the X-axis, and a second direction crossing at right angles to the optical axis and first direction is shown as the Y-axis.

Additionally, in FIG. 2, reference numeral 7 denotes a release button, 6 denotes a zoom switch, 5 denotes a finder window, 4 denotes ranging windows, 3 denotes a strobe window, and 2 denotes a display portion.

For the lens holding frame 11, a flange-shaped frame portion 112 positioned in a plane substantially vertical to the optical axis is formed on one side of an attachment ring 111, and first and second lenses 12, 13 are contained/disposed at a predetermined interval in the frame portion. An index convex portion for positioning 113 is disposed in a predetermined position of the outer wall of the attachment ring 111.

The frame portion 112 has a pair of lens-side X abutment surfaces 114 and 115 and a pair of lens-side Y abutment surfaces 116 and 117, all on the outer circumferential surface. The abutment surfaces 114, 115, 116 and 117 are flat surfaces that serve to position the lens holding frame 11. The X abutment surfaces 114 and 115 extend substantially parallel to each other and extend and diametrically oppose each other across the optical axis of the optical apparatus. Similarly, the Y abutment surfaces 116 and 117 extend substantially parallel to each other and oppose each other across the optical axis of the optical apparatus. The parallel plane in which the X abutment surfaces 114 and 115 are perpendicular to the planes in which the Y abutment surfaces 116 and 117 lie.

Moreover, an annular female screw portion 101 is projected from the tip end of the frame member 10, and a shoulder 102 forming a plane substantially vertical to the optical axis is formed corresponding to the frame portion 112 of the lens holding frame 11 inside the female screw portion 101. Furthermore, substantially in the middle portion of the shoulder 102 of the frame member 10, an insertion port for assembly 103 is formed corresponding to the attachment ring 111 of the lens holding frame 11. The insertion port 103 of the frame member 10 is formed to be larger than the outer shape of the attachment ring 111 of the lens holding frame 11 by a predetermined amount, so that the lens holding frame 11 can be adjusted with respect to the frame member 10 in the plane substantially vertical to the optical axis.

In the insertion port 103 of the shoulder 102 of the frame member 10, an index groove 100 for positioning is disposed in a predetermined position of the peripheral portion of the port for the index convex portion 113 of the lens holding frame 11. A gap is disposed so as to enable position adjustment of the lens holding frame 11 and frame member 10, while the index convex portion 113 of the lens holding frame 11 is inserted in the index groove 100 of the frame member 10. By the action of the index convex portion 113 and index groove 100, a rotary position around the optical axis is constantly and substantially determined during the assembling of the lens holding frame 11 and frame member 10.

The frame member 10 has a pair of frame-side X axis abutment surfaces 104 and 105 and a pair of frame-side Y axis abutment surfaces 106 and 107, all on the inner circumferential surface. The abutment surfaces 104, 105, 106 and 107 are flat surfaces that serve to position the frame member 10. The X abutment surfaces 104 and 105 extend substantially parallel to each other and extend and are diametrically opposite to each other across the optical axis. The X abutment surfaces 104 and 105 oppose the X abutment surfaces 114 and 115 of the frame portion 112, respectively. Similarly, the Y abutment surfaces 106 and 107 extend substantially parallel to each other and are diametrically opposite each other across the optical axis of the optical axis. The Y abutment surfaces 106 and 107 oppose the Y abutment surfaces 116 and 117 of the frame portion 112, respectively.

The lens holding frame 11 is inserted in such a manner that the index convex portion 113 of the attachment ring 111 is disposed opposite to the index groove 100 of the insertion port 103 of the frame member 10. The attachment ring 111 is inserted in the insertion port 103 of the frame member 10, and the frame and member are assembled in such a manner that the lens-side X abutment portions 114, 115 and lens-side Y abutment portions 116, 117 of the frame portion 112 are disposed opposite to the frame-side X abutment portions 104, 105 and frame-side Y abutment portions 106, 107 of the shoulder 102 of the frame member 10.

In the assembled state, for the lens holding frame 11, respective pairs of gaps for position adjustment are formed at predetermined intervals in the X-axis and Y-axis directions via the optical axis by the lens-side X abutment portions 114, 115 and lens-side Y abutment portions 116, 117 of the frame portion 112 and the frame-side X abutment portions 104, 105 and frame-side Y abutment portions 106, 107 of the shoulder 102 of the frame member 10. Adjustment members 141 to 144 having shapes/sizes in accordance with the gap adjustment amount and having, for example, rectangular parallelepiped shapes are selected and inserted in the gaps formed in these X-axis and Y-axis directions via the optical axis.

Thereby, the lens holding frame 11 is moved with respect to the frame member 10 independently in the X-axis and Y-axis directions in accordance with the shapes/sizes of the adjustment members 141 to 144 inserted in the gaps. The optical axis of the first and second lenses 12, 13 is quantitatively adjusted in the plane in the X-axis and Y-axis directions.

For example, a plurality of various types of shapes/sizes of the adjustment members 141 to 144 are prepared in such a manner that the position of the actual optical axis O2 of the X-axis and Y-axis directions of the optical axis of the first and second lenses 12, 13 of the lens holding frame 11 can be modified to the position of a virtual optical axis O described later. The shapes/sizes are selected in accordance with the displacement amount of the optical axis and the adjustment members are inserted in the gaps (see FIG. 4).

Moreover, for the frame member 10, while the position of the lens holding frame 11 is adjusted via the adjustment members 141 to 144, a press member 15 is attached to the female screw portion 101. The press member 15 is formed substantially in an annular shape, a screw portion 151 is formed in the outer peripheral portion of the member, and a shield portion 152 is formed in the inner peripheral portion of the member. The shield portion is disposed opposite to the adjustment members 141 to 144 and the frame portion 112 of the lens holding frame 11 and regulates movement of the optical axis direction. Moreover, an opening 153 for exposing the first and second lenses 12, 13 is formed substantially in the middle portion of the press member 15.

Thereafter, the screw portion 151 of the press member 15 is set into screw engagement in the female screw portion 101 of the frame member 10. The press member 15 is thereby fastened to the front of the lens holding frame 11. Once the press member 15 is fastened to the lens holding frame 11, the shield portion 152 of the press member 15 oppose the adjusting members 141 to 144 and the frame portion 112 of the lens holding frame 11. The first lens 12 and the second lens 13 are exposed through the opening 153 of the press member 15. Hence, the press member 15 and the adjusting members 114 to 144 cooperate to move the lens holding frame 11 along the optical axis and in a plane substantially perpendicular to the optical axis, whereby the press member 15 adjusts the optical axis of the optical apparatus. At this time, the press member 15 covers the lens holding frame 11, making the optical apparatus look neat and tidy.

In the above-described device constitution, the lens holding frame 11 is inserted in the frame member 10 in such a manner that the index convex portion 113 of the attachment ring 111 is disposed opposite to the index groove 100 of the insertion port 103 of the frame member, and the attachment ring 111 is inserted in the insertion port 103 of the frame member 10 with an adjustment gap. Here, the lens holding frame 11 is assembled in such a manner that the lens-side X abutment portions 114, 115 and lens-side Y abutment portions 116, 117 of the frame portion 112 are disposed opposite to the frame-side X abutment portions 104, 105 and frame-side Y abutment portions 106, 107 of the shoulder 102 of the frame member 10.

Figure 4:
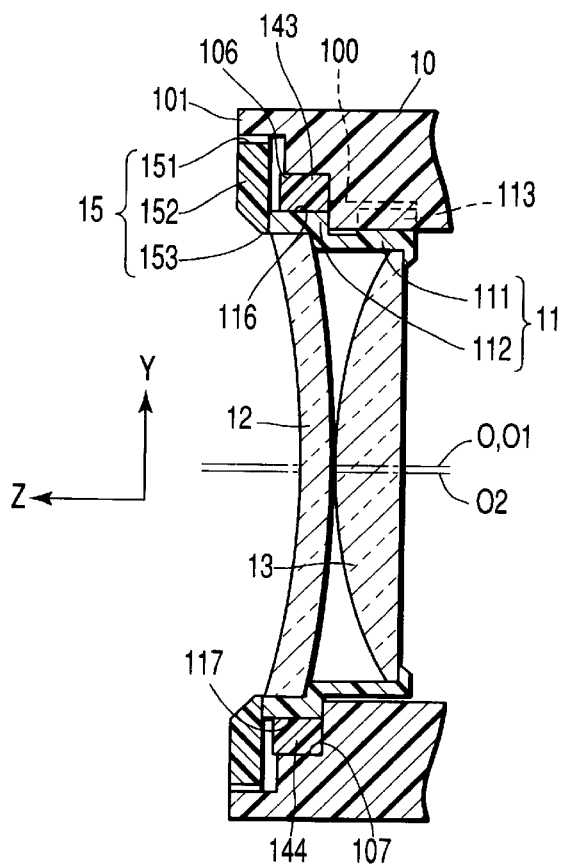
FIG. 4 is a sectional view of a section of FIG. 3 in the Y-axis direction.

In the assembled state, for the lens holding frame 11, adjustment members 141 to 144, for example, having the same shape are inserted in the respective pairs of gaps formed in the X-axis and Y-axis directions via the optical axis by the lens-side X abutment portions 114, 115 and lens-side Y abutment portions 116, 117 of the frame portion 112, and the frame-side X abutment portions 104, 105 and frame-side Y abutment portions 106, 107 of the shoulder 102 of the frame member 10 (see FIG. 4). In this state, assuming that the virtual optical axis in adjusting the optical axis of the first and second lenses 12, 13 is O, the design-targeted optical axis in designing the first and second lenses 12, 13 is O1, and the actual optical axis of the first and second lenses 12, 13 is O2, the optical axes O and O1 agree with each other. However, the actual optical axis O2 is sometimes in a position deviating from the virtual optical axis O because of a manufacturing error or a component assembly error.

The inserted state of the adjustment members 141 to 144 is considered as an initial state, and the actual optical axis O2 is measured by a measuring instrument (not shown). Here, for example, when the actual optical axis O2 of the Y-axis direction is different from the virtual optical axis O of the Y-axis direction and design-targeted optical axis O1, the shapes/sizes of the adjustment members 143, 144 are selected so as to allow the actual optical axis O2 to agree with the virtual optical axis O. Then, the adjustment members are inserted in the gaps formed by the lens-side Y abutment portions 116, 117 and frame-side Y abutment portions 106, 107.

Figure 5:
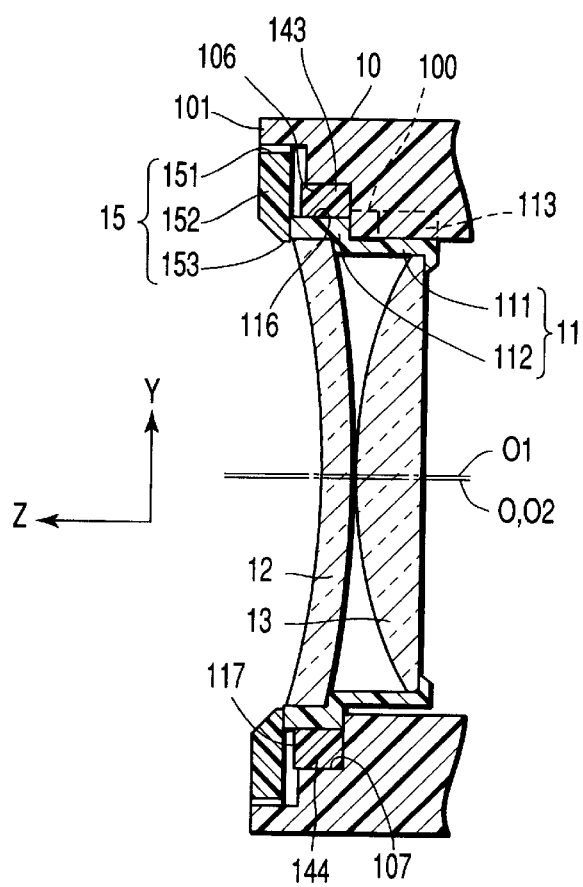
FIG. 5 is a sectional view showing one state of Y-axis direction adjustment of FIG. 4.

Thereby, for the first and second lenses 12, 13 of the lens holding frame 11, as shown in FIG. 5, the Y-axis direction of the optical axis O2 is displaced by a predetermined amount, the axis is allowed to agree with the virtual optical axis O, and the optical axis of the Y-axis direction is adjusted.

Moreover, in the X-axis direction of the first and second lenses 12, 13 of the lens holding frame 11, the adjustment members 141, 142 are similarly selected so that the actual optical axis O2 agrees with the virtual optical axis O, and they are inserted in the gaps formed by the lens-side X abutment portions 114, 115 and frame-side X abutment portions 104, 105. Thereby, the first and second lenses 12, 13 of the lens holding frame 11 are displaced in the X-axis direction of the actual optical axis O2 by a predetermined amount so that the optical axis agrees with the virtual optical axis O. Here, for the first and second lenses 12, 13 of the lens holding frame 11, the X-axis and Y-axis directions of the actual optical axis O2 are aligned with those of the virtual optical axis O, and the optical axis adjustment is completed.

After the optical axis is measured once in this manner, the adjustment members 141 to 144 are replaced. Therefore, the above-described index convex portion 113 and index groove 100 are disposed in order to prevent the rotary positions of the lens holding frame 11 and frame member 10 around the optical axis from changing. Moreover, when the positional deviation of the actual optical axis O2 and virtual optical axis O is within a range having no problem in actual use in the initial state, it is unnecessary to change the adjustment members 141 to 144. In this case, only components having large manufacturing and assembly errors (components having large dispersions) are adjusted, the adjustment of components having relatively small errors (components having small dispersions) can be omitted, and the number of operation steps can be reduced.

During the optical axis adjustment, the shapes/sizes of the adjustment members 141 to 144 to be inserted are selected based on the actual optical axis O2. The adjustment members having different shapes/sizes are inserted in the pairs of gaps disposed opposite to each other and formed by the lens-side X abutment portions 114, 115 and lens-side Y abutment portions 116, 117 of the frame portion 112 of the lens holding frame 11, and the frame-side X abutment portions 104, 105 and frame-side Y abutment portions 106, 107 of the shoulder 102 of the frame member 10. The members are inserted in the gaps of one direction where necessary, and the desired optical axis position is set.

Moreover, in the state in which the optical axis setting is complete, the screw portion 151 of the press member 15 is attached to the female screw portion 101 of the frame member 10, and assembled on the front surface side of the lens holding frame 11. Here, the shield portion 152 of the press member 15 is disposed opposite to the adjustment members 141 to 144 and the frame portion 112 of the lens holding frame 11, and the positions of the optical axis direction of these members are regulated. In this state, the first and second lenses 12, 13 of the lens holding frame 11 are exposed via the opening 153. Thereby, the position of the lens holding frame 11 in the plane substantially vertical to the optical axis and in the optical axis direction is regulated, for example, by the press member 15 and adjustment members 141 to 144. Additionally, in the state in which adjustment of the optical axis is complete, the optical axis adjustment structure is covered and the appearance is not spoiled Additionally, in the state in which adjustment of the optical axis is complete, the optical axis adjustment structure is covered and the appearance is not spoiled.

As described above, the optical apparatus is constituted such that the lens holding frame 11 is assembled with the frame member 10 so as to be movable along the plane substantially vertical to the optical axis of the first and second lenses 12, 13, pairs of gaps are formed between the outer periphery of the lens holding frame 11 and the inner periphery of the frame member 10 in the X-axis and Y-axis directions via the optical axis, adjustment members 141 to 144 are selectively inserted in the gaps, and the position of the lens holding frame 11 with respect to the frame member 10 in the plane substantially vertical to the optical axis is set.

According to this device constitution, when the position of the lens holding frame 11 relative to the frame member 10 is adjusted, the adjustment members 141 to 144 are inserted in the gaps formed between the frame and the member. Then, the lens holding frame is moved/adjusted in the plane substantially vertical to the optical axis of the lens by the amount corresponding to the sizes of the adjustment members 141 to 144. In the state in which the lens holding frame and frame member are positioned with respect to each other by the adjustment members 141 to 144 in the adjusted position, the optical axis adjustment is completed. As a result, the optical axis adjustment structure is simplified and a simple device constitution is obtained. Additionally, high-precision position adjustment of the lens optical axis is realized by the simple operation of selecting the sizes of the adjustment members 141 to 144 and inserting the members in the gaps.

Moreover, according to the device constitution, even when a lens holding frame 11 having the position thereof adjusted is fixed onto the frame member 10, the mutual positions of the frame and member are regulated in the plane substantially vertical to the optical axis via the adjustment members 141 to 144. Thereby, high-precision positioning/fixing is easily enabled.

Furthermore, according to the above device constitution, for example, when the optical axis of the optical system constituting the optical apparatus is adjusted, the position of the lens holding frame 11 as the characteristic of the present invention is adjusted in the plane substantially vertical to the optical axis via the adjustment members 141 to 144. The frame member 10 assembled with the lens holding frame is first assembled/disposed, for example, with the lens group of another frame member constituting the optical system. In the assembled state, the degree of eccentricity from the lens optical axis of another frame member is measured. Moreover, when the adjustment members 141 to 144 are replaced and the position of the X-axis and Y-axis directions is adjusted in accordance with the measured eccentricity, the eccentricity of the optical system can be adjusted.

Thereby, the step of measuring the eccentricity of the lens can be performed separately from the eccentricity adjusting step, and the assembly operation is conveniently and easily realized.

Figure 3:
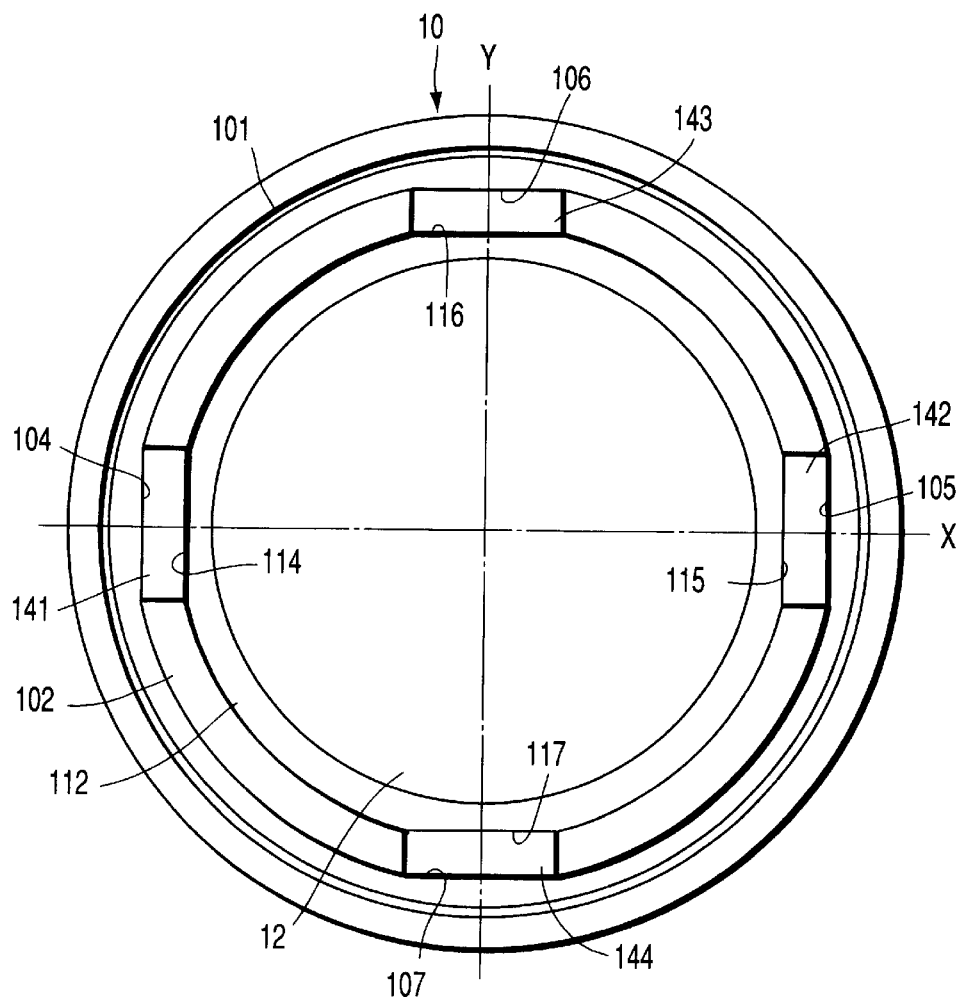
FIG. 3 is a plan view showing the assembled state of FIG. 1 from an optical axis direction.
Figure 7:
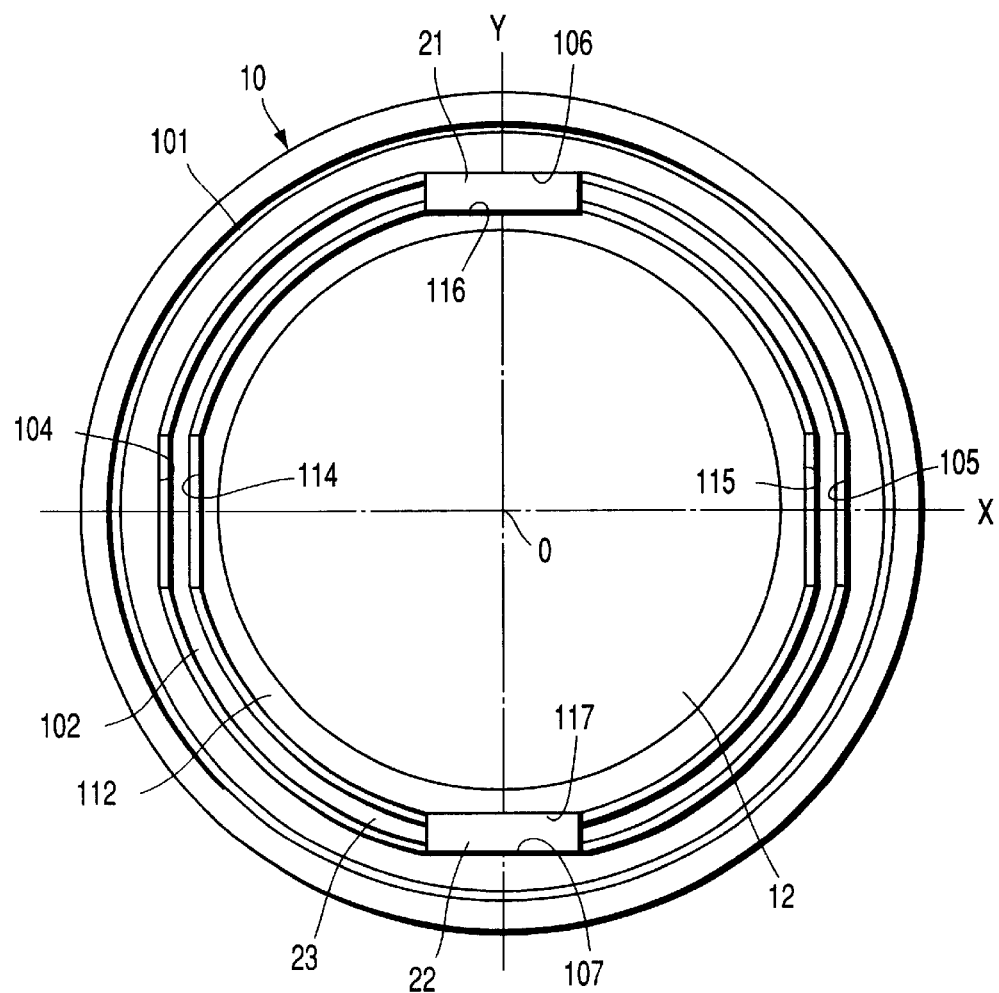
FIG. 7 is a plan view showing the assembled state of FIG. 6 from the optical axis direction.

Additionally, the present invention is not limited to the above-described embodiment, and may further be constituted as shown in FIGS. 6 and 7. Additionally, in FIGS. 6 and 7, the same components as those of FIGS. 1 and 3 are denoted with the same reference numerals and the descriptions thereof are omitted.

In FIGS. 6 and 7, first and second adjustment portions 21, 22 having substantially rectangular parallelepiped shapes are connected via an annular coupling portion 23 having flexibility to the lens-side X abutment portions 114, 115 or the lens-side Y abutment portions 116, 117 (the frame-side X abutment portions 104, 105 or the frame-side Y abutment portions 106, 107) at predetermined intervals. Such an adjustment member 20 is used in this device constitution.

That is, the first and second adjustment portions 21, 22 of the adjustment member 20 are formed in substantially rectangular parallelepiped shapes corresponding to the gaps formed by the lens-side X abutment portions 114, 115 or the lens-side Y abutment portions 116, 117 (the frame-side X abutment portions 104, 105 or the frame-side Y abutment portions 106, 107). Moreover, the first and second adjustment portions 21, 22 are connected to each other via the coupling portion 23 so as to be elastically deformable so that the one surface of each adjustment portion in the optical axis direction is aligned with the surface of the coupling portion. The other surface of each adjustment portion in the optical axis direction projects from the coupling portion 23 in the optical axis direction.

Moreover, for the adjustment members 20, the coupling portions 23 for connecting the first and second adjustment portions 21, 22 are formed so that the members can be contained in the gaps formed by the lens holding frame 11 and frame member 10 including the gaps formed by the lens-side X abutment portions 114, 115 and lens-side Y abutment portions 116, 117 and the frame-side X abutment portions 104, 105 and frame-side Y abutment portions 106, 107.

Furthermore, for the adjustment members 20, a plurality of types of shapes/sizes of the adjustment members in the direction substantially vertical to the optical axis of the first and second adjustment portions 21, 22 are prepared so that the displacement amounts of the X-axis and Y-axis directions of the actual optical axis O2 of the first and second lenses 12, 13 of the lens holding frame 11 agree with those of the virtual optical axis O. The adjustment members are selected in accordance with the displacement amount of the optical axis and inserted in the gaps.

According to the above-described device constitution, each set of the first and second adjustment portions 21, 22 of the adjustment member 20 is inserted in a pair of first and second gaps of the X-axis direction formed by the lens-side X abutment portions 114, 115 of the frame portion 112 of the lens holding frame 11 and the frame-side X abutment portions 104, 105 of the shoulder 102 of the frame member 10. In this case, when each coupling portion 23 is elastically deformed, the position errors of the first and second adjustment portions 21, 22 are absorbed. The position of the lens holding frame 11 relative to the frame member 10 is determined by the thicknesses and gaps in the diametric direction of the first and second adjustment portions 21, 22.

In this case, two adjustment members 20 are inserted in the gaps of the X-axis and Y-axis directions so that the projecting surfaces of the first and second adjustment portions 21, 22 are disposed opposite to those of the other adjustment member. Thereby, the two adjustment members 20 do not interfere with each other, and a space can effectively be used. The adjustment members can be assembled/disposed in the vicinity of each other between the lens holding frame 11 and the frame member 10, and miniaturization is realized in the optical axis direction.

Moreover, in the above-described embodiments, the lens holding frame 11 is assembled onto the frame member 10 via the adjustment members 141 to 144 (20). In this state, the press member 15 is attached/assembled and the position of the optical axis direction is regulated in the constitution. However, the present invention is not limited to this constitution, and can also be constituted such that the press member 15 is attached to the frame member 10 by other methods.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An optical apparatus comprising:
   a lens holding frame configured to receive a lens, said lens holding frame having an outer periphery provided with at least one abutment surface;
   a frame member to support said lens holding frame so that said lens holding frame can move along a plane perpendicular to an optical axis of said lens, said frame member having an inner periphery provided with at least one abutment surface, a gap being formed between the outer periphery of said lens holding frame and the inner periphery of said frame member; and
   at least one adjustment member arranged in the gap, said adjustment member contacting the abutment surface of said outer periphery of said lens holding frame and the abutment surface of said inner periphery of said frame member:
   wherein a position of said lens holding frame to said frame member in said plane is set.

2. The optical apparatus according to claim 1, further comprising:
   a press member which is fixed to said frame member, and which can hold said lens holding frame with said frame member in a fixed state,
   wherein the press member fixed onto said frame member regulates movement of said lens holding frame in the optical axis direction in a state in which the position of said lens holding frame relative to said frame member is adjusted.

3. The optical apparatus according to claim 2, wherein said press member includes a shield portion with which said adjustment member is covered, and an opening via which said lens is exposed.

4. An optical apparatus comprising:
   a lens holding frame to receive at least one lens, said lens holding frame having an, outer periphery provided with at least one pair of lens-side abutment surfaces, said pair of lens-side abutment surfaces including first and second lens-side abutment surfaces disposed parallel to each other and on opposite sides of an optical axis of said lens;
   a frame member including an inner periphery provided with at least one pair of frame-side abutment surfaces disposed parallel to each other, said pair of frame-side abutment surfaces including first and second frame-side abutment surfaces, said first frame-side abutment surface being disposed opposite said first lens-side abutment surface, said second frame-side abutment surface being disposed opposite said second lens-side abutment surface, a first predetermined gap being formed between said first frame-side abutment surface and said first lens-side abutment surface, a second predetermined gap being formed between said second frame-side abutment surface and said second lens-side abutment surface;
   a first adjustment member arranged within said first predetermined gap, said first adjustment member contacting said first lens-side abutment surface and said first frame-side abutment surface; and
   a second adjustment member arranged within said second predetermined gap, said second adjustment member contacting said second lens-side abutment surface and said second frame-side abutment surface,
   wherein thicknesses of said first adjustment member and said second adjustment member are selected, so that a position of said lens holding frame relative to said frame member is adjusted.

5. The optical apparatus according to claim 4, further comprising: a press member which is fixed to said frame member, and which can hold said lens holding frame with said frame member.

6. The optical apparatus according to claim 5, wherein said press member includes a shield portion with which said first adjustment member and said second adjustment member are covered, and an opening via which said lens is exposed.

7. The optical apparatus according to claim 4, wherein the at least one pair of lens-side abutment surfaces includes a second pair of lens-side abutment surfaces, said second pair of lens-side abutment surfaces including third and fourth lens-side abutment surfaces disposed parallel to each other and on opposite sides of the optical axis of said lens, said third and fourth lens-side abutment surfaces being disposed perpendicularly to the first and second abutment surfaces, the at least one pair of frame-side abutment surfaces including a second pair of frame-side abutment surfaces, said second pair of frame-side abutment surfaces including third and fourth frame-side abutment surfaces disposed parallel to each other, said third frame-side abutment surface being disposed opposite said third lens-side abutment surface, said fourth frame-side abutment surface being disposed opposite said fourth lens-side abutment surface, a third predetermined gap being formed between said third frame-side abutment surface and said third lens-side abutment surface, a fourth predetermined gap being formed between said fourth frame-side abutment surface and said fourth lens-side abutment surface, the optical apparatus further comprising:
   a third adjustment member arranged within said third predetermined gap, said third adjustment member contacting said third lens-side abutment surface and said third frame-side abutment surface; and
   a fourth adjustment member arranged within said fourth predetermined gap, said fourth adjustment member contacting said fourth lens-side abutment surface and said fourth frame-side abutment surface,
   wherein the thicknesses of said first, second, third, and fourth adjustment members are selected, so that the position of said lens holding frame relative to said frame member can be adjusted in two directions crossing at right angles to each other.

8. The optical apparatus according to claim 7, further comprising: a press member which is fixed to said frame member, and which can hold said lens holding frame with said frame member.

9. The optical apparatus according to claim 8, wherein said press member includes a shield portion with which said first to fourth adjustment members are covered, and an opening via which said lens is exposed.

10. An optical apparatus comprising:
    a lens holding frame to receive at least one lens, said lens holding frame having an outer periphery provided with at least one pair of lens-side abutment surfaces, said pair of lens-side abutment surfaces including first and second lens-side abutment surfaces disposed parallel to each other and on opposite sides of an optical axis of said lens;
    a frame member into which said lens holding frame is assembled, said frame member including an inner periphery provided with at least one pair of frame-side abutment surfaces disposed parallel to each other, said pair of frame-side abutment surfaces including first and second frame-side abutment surfaces, said first frame-side abutment surface being disposed opposite said first lens-side abutment surface, said second frame-side abutment surface being disposed opposite said second lens-side abutment surface, a first predetermined gap being formed between said first frame-side abutment surface and said first lens-side abutment surface, a second predetermined gap being formed between said second frame-side abutment surface and said second lens-side abutment surface; and a first adjustment member including a first adjustment portion and a second adjustment portion, said first adjustment portion being arranged within said first predetermined gap, said second adjustment portion being arranged within said second predetermined gap.

11. The optical apparatus according to claim 10, wherein said first adjustment member includes a flexible coupling portion to couple said first adjustment portion and said second adjustment portion.

12. The optical apparatus according to claim 10, further comprising:

a press member which is fixed to said frame member, and which can hold said lens holding frame with said frame member in a fixed state, wherein said press member and said frame member hold said lens holding frame, so that movement of said lens holding frame in the optical axis direction is regulated.

13. The optical apparatus according to claim 12, wherein said press member includes a shield portion with which said first adjustment member is covered, and an opening via which said lens is exposed.

14. The optical apparatus according to claim 10, wherein the at least one pair of lens-side abutment surfaces includes a second pair of lens-side abutment surfaces, said second pair of lens-side abutment surfaces including third and fourth lens-side abutment surfaces disposed parallel to each other and on opposite sides of the optical axis of said lens, said third and fourth lens-side abutment surfaces being disposed perpendicularly to the first and second abutment surfaces, the at least one pair of frame-side abutment surfaces including a second pair of frame-side abutment surfaces, said second pair of frame-side abutment surfaces including third and fourth frame-side abutment surfaces disposed parallel to each other, said third frame-side abutment surface being disposed opposite said third lens-side abutment surface, said fourth frame-side abutment surface being disposed opposite said fourth lens-side abutment surface, a third predetermined gap being formed between said third frame-side abutment surface and said third lens-side abutment surface, a fourth predetermined gap being formed between said fourth frame-side abutment surface and said fourth lens-side abutment surface, the optical apparatus further comprising:

a second adjustment member including a third adjustment portion and a fourth adjustment portion, said third adjustment portion being arranged within said third predetermined gap, said fourth adjustment portion being arranged within said fourth predetermined gap, wherein the thicknesses of said first, second, third, and fourth adjustment portions are selected, so that a position of said lens holding frame relative to said frame member can be adjusted in two directions crossing at right angles to each other.

15. The optical apparatus according to claim 14, wherein said second adjustment member includes a flexible coupling portion to couple said third adjustment portion and said fourth adjustment portion.

16. The optical apparatus according to claim 14, further comprising:

a press member which is fixed to said frame member, and which can hold said lens holding frame with said frame member in a fixed state, wherein said press member and said frame member hold said lens holding frame, so that movement of said lens holding frame in the optical axis direction is regulated.

17. The optical apparatus according to claim 16, wherein said press member includes a shield portion with which said first and second adjustment members are covered, and an opening via which said lens is exposed.

18. An optical apparatus comprising:

a lens holding frame to receive at least one lens, said lens holding frame having an outer periphery provided with first and second pairs of lens-side abutment surfaces, said first pair of lens-side abutment surfaces including first and second lens-side abutment surfaces disposed parallel to each other and on opposite sides of an optical axis of said lens, said second pair of lens-side abutment surfaces including third and fourth lens-side abutment surfaces disposed parallel to each other and on opposite sides of said optical axis of said lens, said third and fourth lens-side abutment surfaces being disposed perpendicularly to said first and second abutment surfaces;

a frame member into which said lens holding frame is assembled, said frame member including an inner periphery provided with first and second pairs of frame-side abutment surfaces, said first pair of frame-side abutment surfaces including first and second frame-side abutment surfaces disposed parallel to each other, said second pair of frame-side abutment surfaces including third and fourth frame side abutment surfaces disposed parallel to each other, said first, second, third, and fourth frame-side abutment surfaces being disposed opposite said first, second, third, and fourth lens-side abutment surfaces, respectively, a first predetermined gap being formed between said first frame-side abutment surface and said first lens-side abutment surface, a second predetermined gap being formed between said second frame-side abutment surface and said second lens-side abutment surface, a third predetermined gap being formed between said third frame-side abutment surface and said third lens-side abutment surface, a fourth predetermined gap being formed between said fourth frame-side abutment surface and said fourth lens-side abutment surface; and a first adjustment member including a first adjustment portion and a second adjustment portion, said first adjustment portion being arranged within said first predetermined gap, said second adjustment portion being arranged within said second predetermined gap;

a second adjustment member including a third adjustment portion and a fourth adjustment portion, said third adjustment portion being arranged within said third predetermined gap, said fourth adjustment portion being arranged within said fourth predetermined gap;

wherein the thicknesses of said first adjustment portion and said second adjustment portion are selected, so that a position of the lens holding frame relative to said frame member can be adjusted in two directions crossing at right angles to each other.

19. The optical apparatus according to claim 18, wherein said adjustment member includes a flexible coupling portion to couple said first adjustment portion and said second adjustment portion.

20. The optical apparatus according to claim 18, further comprising:

a press member which is fixed to said frame member, and which can hold said lens holding frame with said frame member in a fixed state;

a shield portion which is disposed in said press member, and with which said adjustment member is covered; and an opening which is disposed in said press member, and via which said lens is exposed, wherein said press member and said frame member hold said lens holding frame, so that movement of said lens holding frame in the optical axis direction is regulated.

* * * * *